United States Patent [19]
Kotzin et al.

[11] Patent Number: 5,555,447
[45] Date of Patent: Sep. 10, 1996

[54] METHOD AND APPARATUS FOR MITIGATING SPEECH LOSS IN A COMMUNICATION SYSTEM

[75] Inventors: Michael D. Kotzin, Buffalo Grove; Gary W. Grube, Palatine, both of Ill.

[73] Assignee: Motorola, Inc., Schaumburg, Ill.

[21] Appl. No.: 62,643

[22] Filed: May 14, 1993

[51] Int. Cl.⁶ .................................................. H04B 7/00
[52] U.S. Cl. .......................... 455/72; 455/34.2; 455/54.1; 455/116; 379/88; 370/84; 370/109
[58] Field of Search .......................... 455/34.2, 72, 54.1, 455/54.2, 79, 116, 33.1; 375/122, 363; 379/88, 63; 395/2.79; 370/118, 111, 80, 81, 84, 29, 109

[56] References Cited

U.S. PATENT DOCUMENTS

| | | | |
|---|---|---|---|
| 4,100,377 | 7/1978 | Flanagan | 370/81 |
| 4,164,626 | 8/1979 | Fette | 179/1 SC |
| 4,821,310 | 4/1989 | Lynk et al. | 455/54.2 |
| 4,839,923 | 6/1989 | Kotzin | 370/109 |
| 5,014,303 | 5/1991 | Velius | 379/201 |
| 5,109,525 | 4/1992 | Nichols | 455/89 |

OTHER PUBLICATIONS

"Real-Time Implementation of Time Domain Harmonic Scaling of speech for Rate Modification and Coding", Richard V. Cox et al., *IEEE Transactions on Acoustics, Speech, and Signal Processing*, vol. ASSP-31, No. 1, Feb., 1993, U.S.A. pp. 258–272.

"Time Compression and Expansion of Speech by the Sampling Method", Francis F. Lee; *Journal of the Audio Engineering Society*, vol. 20, No. 9, Nov., 1972, U.S.A. pp. 738–742.

*Primary Examiner*—Reinhard J. Eisenzopf
*Assistant Examiner*—Doris To
*Attorney, Agent, or Firm*—Richard A. Sonnentag

[57] ABSTRACT

A communication system mitigates speech loss due to a delay (D) incurred during communication channel set-up and also accounts for the delay (D). The communication system time-compresses certain speech spoken by a user and buffers this time-compressed speech in a FIFO (827) at least until the communication channel set-up has been completed. Upon channel set-up, the communication system begins transmission of the stored time-compressed speech and transitions to transmission of normal spoken speech when the FIFO (827) storing the time-compressed speech is substantially empty.

14 Claims, 5 Drawing Sheets

1 SECONDARY UNIT MAKES CHANNEL REQUEST.

2 PRIMARY UNIT SENDS OUT CHANNEL ASSIGNMENT MESSAGE TO ALL SECONDARY UNITS.

3 ALL SECONDARY UNITS GO TO ASSIGNED CHANNEL. REQUESTING SECONDARY UNIT ENABLES TRANSMITTER TO COMMUNICATE SPEECH. ALL OTHER SECONDARY UNITS ENABLE RECEIVERS TO LISTEN.

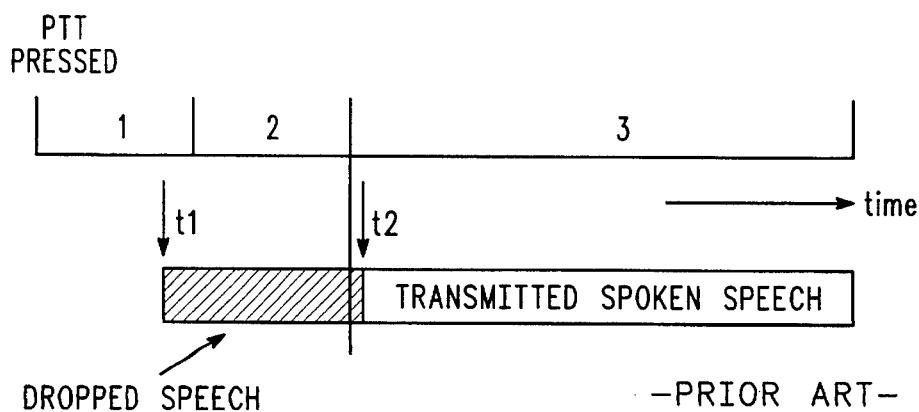
FIG.3 —PRIOR ART—
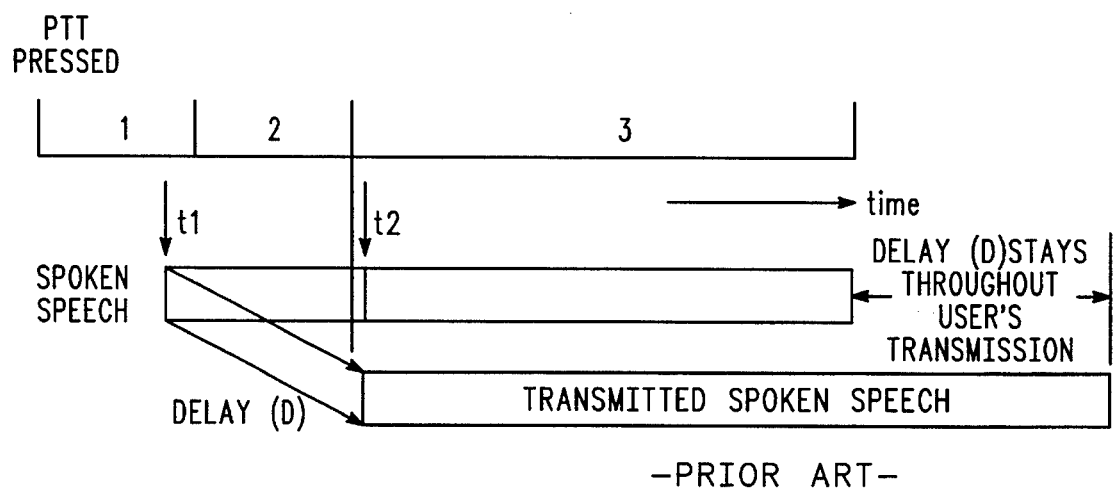
FIG.4 —PRIOR ART—
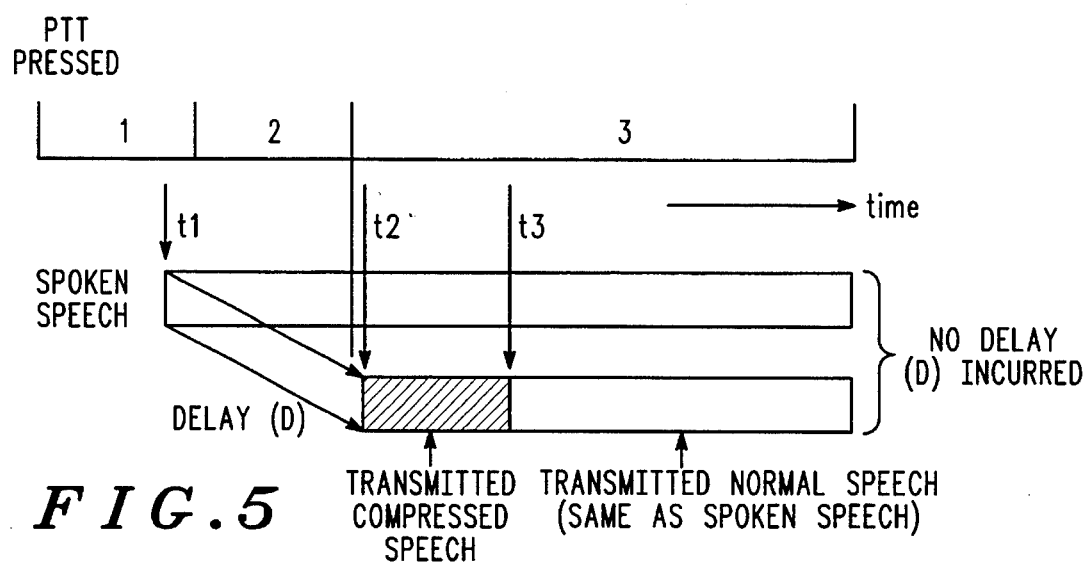
FIG.5

FIG.6
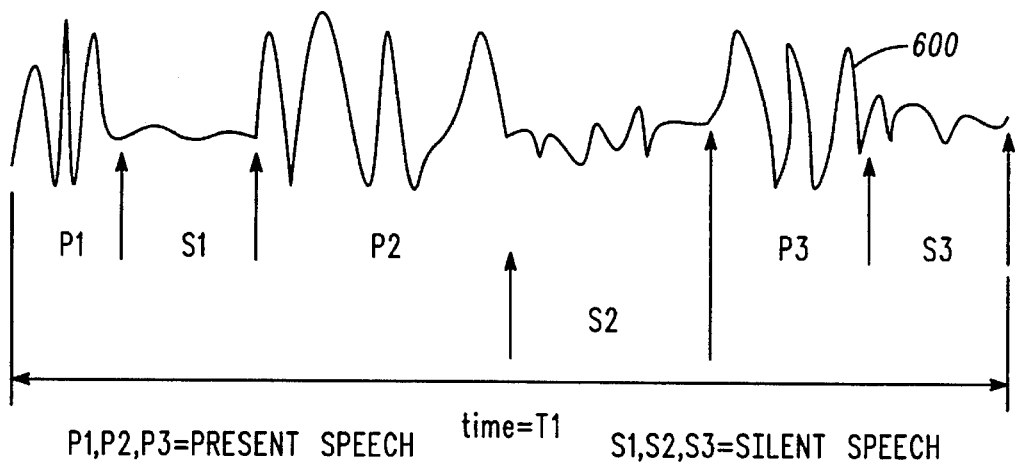
P1,P2,P3=PRESENT SPEECH    time=T1    S1,S2,S3=SILENT SPEECH
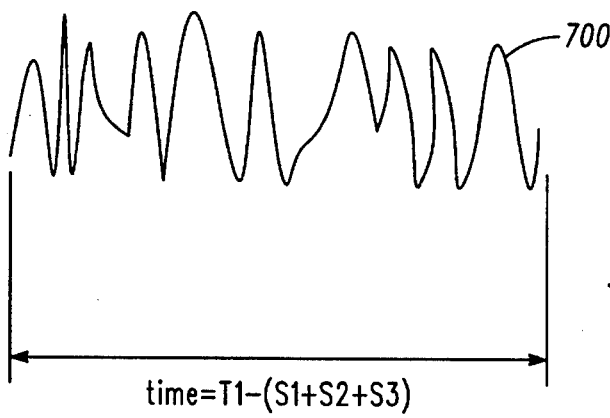
time=T1−(S1+S2+S3)
FIG.7
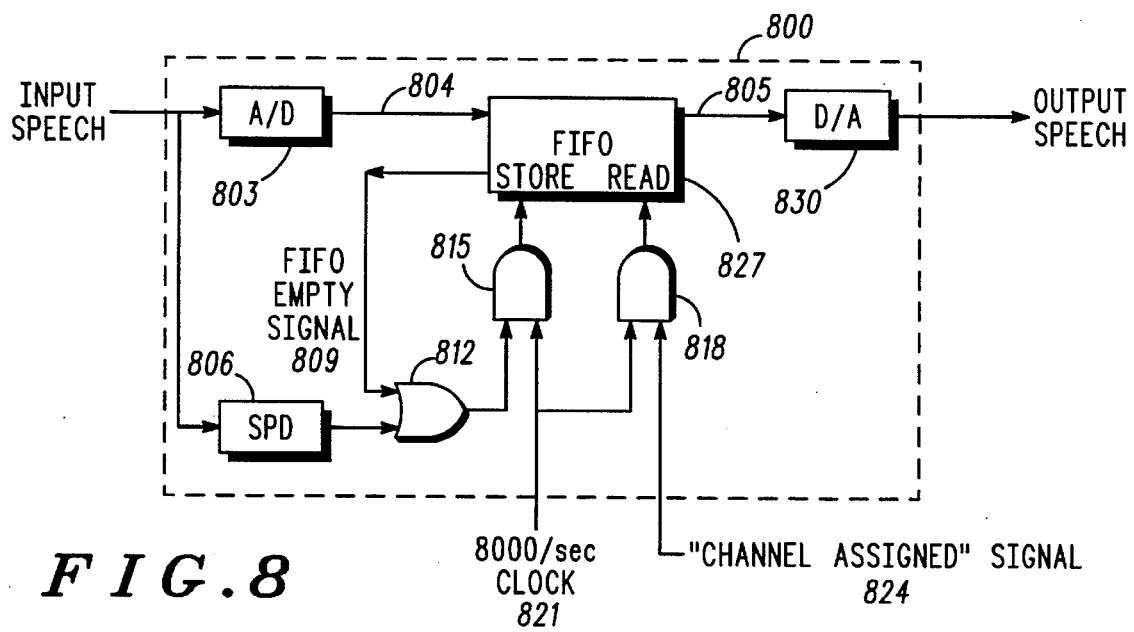
FIG.8

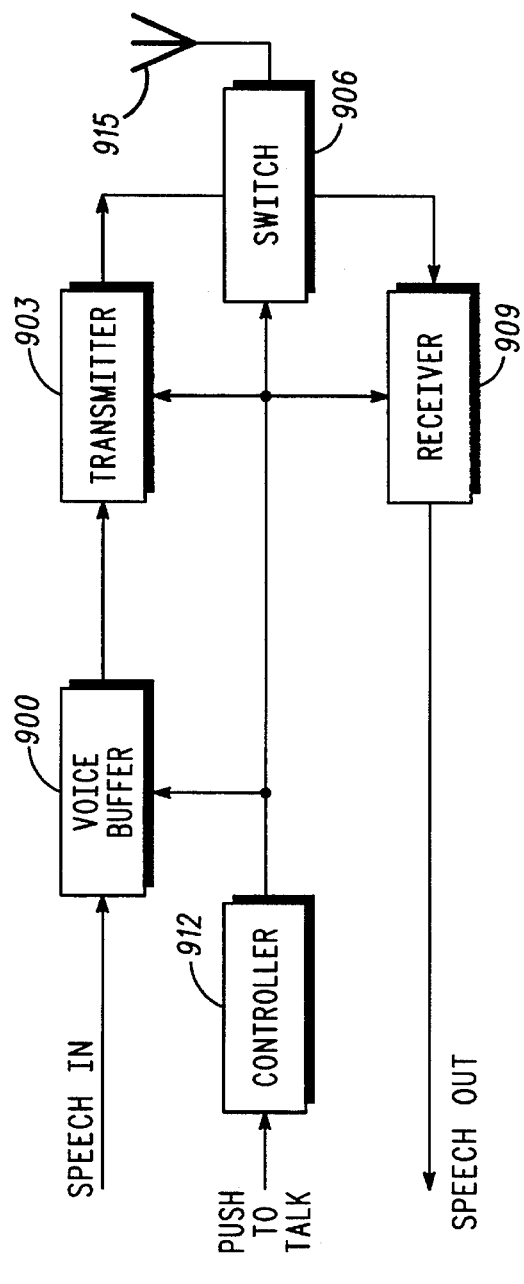
FIG. 9 —PRIOR ART—
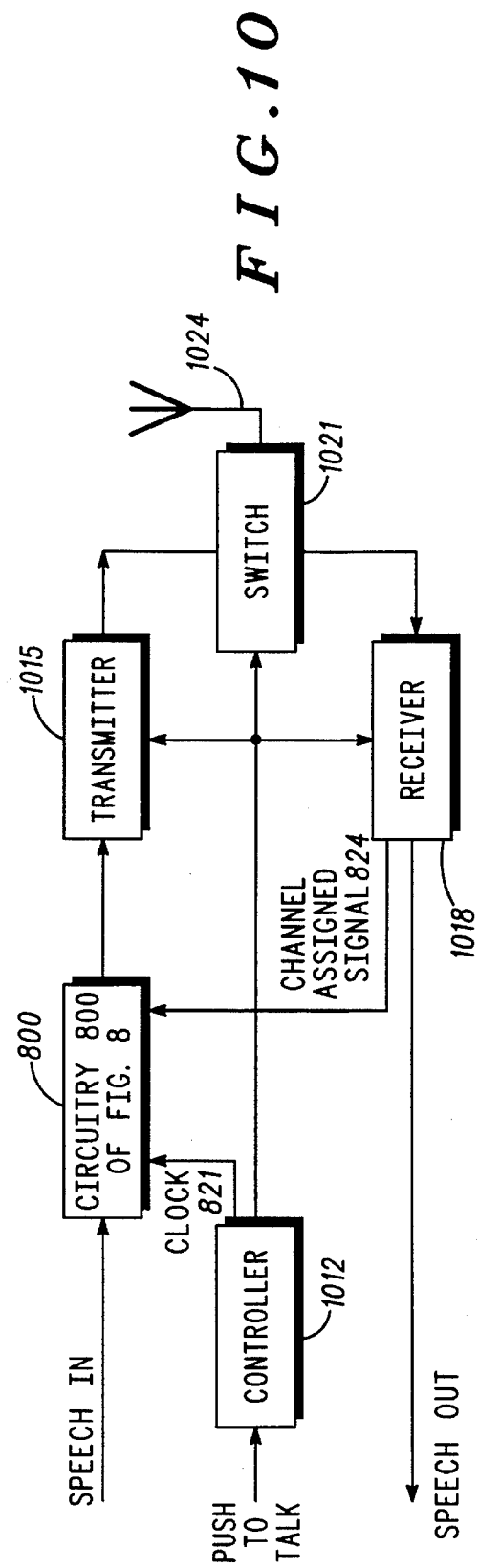
FIG. 10

METHOD AND APPARATUS FOR MITIGATING SPEECH LOSS IN A COMMUNICATION SYSTEM

FIELD OF THE INVENTION

The invention relates generally to communication systems, and more specifically to communication systems which incur a time delay during channel set-up.

BACKGROUND OF THE INVENTION

It is well known to allocate radio channels for speech users on an as-needed basis. There are several systems which serve as examples.

In a trunked dispatch radio system, it is well known to allocate radio channels upon the request of a subscriber. Basically, the subscriber radio, when not in active talking, monitors a control channel. When the subscriber wants to make a call to other subscribers, a push-to-talk (PTT) button is depressed which initiates a channel request sequence. A request data message is transmitted, and the subscriber radio reverts to a receive mode on that channel to listen for a channel grant. When a channel grant is received, the subscriber radio moves its synthesizer to the assigned frequency and a speech path is enabled. Speech can then be transmitted so long as the PTT is activated. A more detailed explanation of one such system is included in U.S. Pat. No. 4,821,310 to Lynk. Alternatively, a voice activated transmit (VOX) technique may be used.

Another such system is the so-called Extended-Time Division Multiple Access (E-TDMA) cellular radiotelephone system. In the E-TDMA system, cellular radio channels are allocated and de-allocated based on measured speech activity of the subscribers. When the subscriber stops talking for a period of time, the channel is relinquished for other subscribers. As soon as speech activity is detected, a channel is requested. Speech starts to use a particular voice channel as soon as a channel grant is received.

It is well known that the delay which occurs from the time the PTT is activated (or speech activity begins for VOX operated systems) until the time the speech channel is actually available for communications is quite deleterious to the communication. The reason for this is that some of the speech information is lost, and can never be recovered.

One solution to the lost speech problem is to buffer speech while the channel is being requested, and to replay the buffered speech after the voice channel actually becomes available. In this solution, the delay, which is often of an uncertain amount, is inserted into the voice channel. In a dispatch system, where acoustic feedback to the talker is often present, the delay inserted into voice channel can cause significant confusion. One well known example is in the public safety arena. At a fire site, one user may increase the volume of a radio so that it can be heard by a nearby users. If one of those nearby user has a portable radio and attempts to talk on the system, he will hear himself delayed in time. This scenario may cause significant confusion indeed.

Therefore, a need exists for a communication system which eliminates the loss of speech due to time delay incurred during channel set-up.

BRIEF DESCRIPTION OF THE DRAWINGS

FIG. 3 generally depicts a timing diagram, referenced to FIG. 2, of a prior art system where spoken speech is dropped between the time a PTT is pressed and the channel is set-up.

FIG. 4 generally depicts a timing diagram, referenced to FIG. 2, of a prior art system where spoken speech is delayed between the time a PTT is pressed and the channel is set-up, and the delay is present throughout the user's transmission.

FIG. 5 generally depicts a timing diagram, referenced to FIG. 2, of a system in accordance with the invention.

FIG. 6 generally depicts a typical pattern of spoken speech having present speech and silent speech.

FIG. 7 generally illustrates time-compression of the pattern of FIG. 6 to include only present speech.

FIG. 8 generally illustrates circuitry which may generate the timing of FIG. 5 in accordance with the invention.

FIG. 9 generally depicts, in block diagram form, a prior art system which generates the timing of FIG. 4.

FIG. 10 generally depicts, in block diagram form, a system which implements the circuitry of FIG. 8 in accordance with the invention.

DETAILED DESCRIPTION OF A PREFERRED EMBODIMENT

Figure 1:
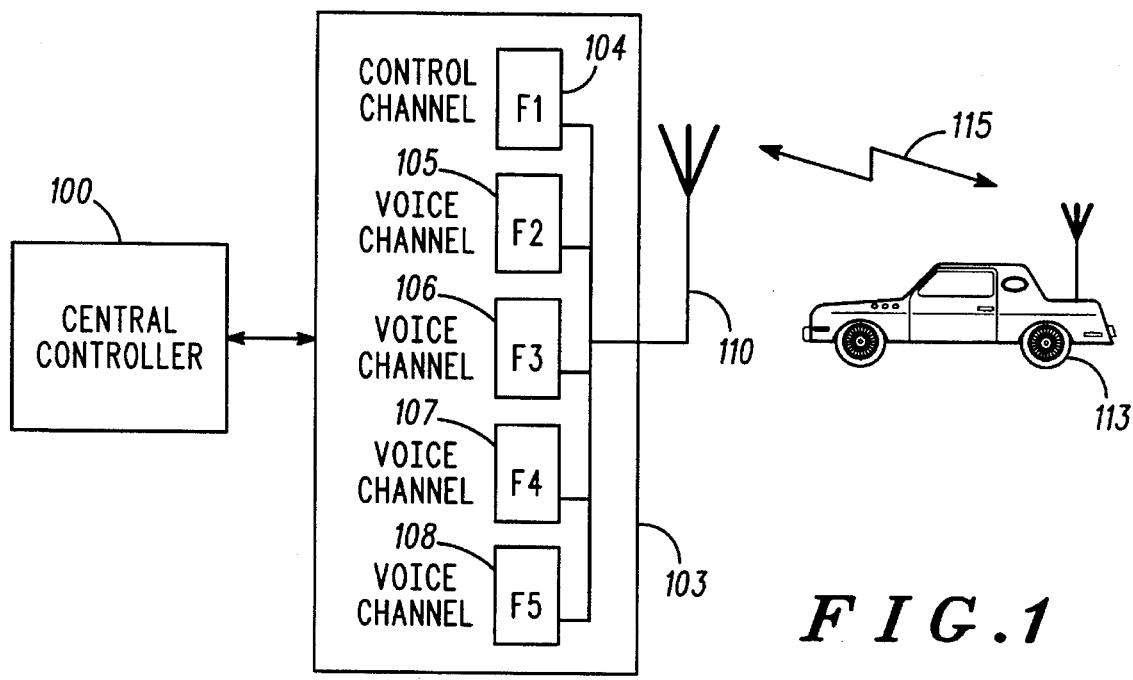
FIG. 1. generally depicts a communication system which may beneficially employ the present invention.

FIG. 1. generally depicts a communication system which may beneficially employ the present invention. In the preferred embodiment, FIG. 1 represents a trunked dispatch radio system, where, also in the preferred embodiment, primary unit 103 is a repeater station coupled to a central controller 100. A similar system is described in U.S. Pat. No. 4,821,310 to Lynk, which is incorporated herein by reference. The present invention may likewise be beneficially employed in an extended time division multiple access (E-TDMA) cellular radio telephone system or any other communication system which incurs a time delay during channel set-up. If the communication system were an E-TDMA cellular radio telephone system, primary unit 103 would be a base-station coupled to a local switch which would in turn be coupled to a public switched telephone network (PSTN). Continuing, primary unit 103 is further comprised of, inter alia, transceivers (i.e., a transmitter/receiver) 104–108. Transceivers 104–108 are capable of transmitting and receiving a control channel (F1) and a plurality of voice channels (F2–F5). Primary unit 103 communicates to a secondary unit 113 via a radio frequency (RF) signal 115. Although only a single secondary unit 113 is shown, primary unit 103 may communicate to a plurality of secondary units in the preferred embodiment. The trunked dispatched radio system depicted in FIG. 1, establishes communications to the primary unit 103 on a push-to-talk (PTT) basis. Essentially, when a subscriber wishes to talk, the subscriber presses a PTT button on secondary unit 113.

Figure 2:
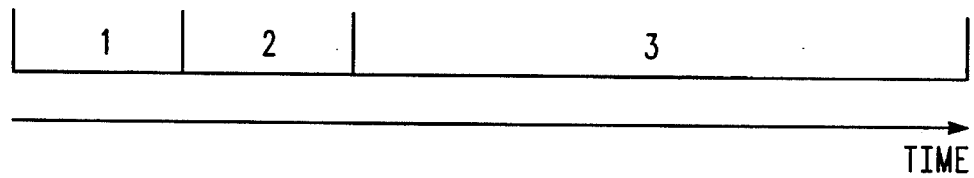
FIG. 2 generally depicts, in time, a series of steps taken by secondary unit 113 and primary unit 103 to perform channel setup to establish communication after a push-to-talk (PTT) is pressed.

FIG. 2 generally depicts, in time, the series of steps taken by secondary unit 113 and primary unit 103 to establish communication after the PTT button is pressed. After the PTT is pressed, secondary unit 113 makes a channel request during the time period 1 in FIG. 2. During time period 2 of FIG. 2, primary unit 103 sends out a channel assignment message (not shown) to all secondary units in communication with primary unit 103, including secondary unit 113. During time period 3 of FIG. 2, all secondary units go to the assigned channel, secondary unit 113 (which initially made the channel request) enables its transmitter to communicate speech, and all other secondary units enable their receivers to listen to the transmitted speech. Important to note is that immediately after the PTT button is pressed (i.e., within time period 1 of FIG. 2), the subscriber begins talking although a channel has not yet been assigned.

This situation is depicted, generally, in FIG. 3. FIG. 3 depicts both the timing of FIG. 2 related to channel set-up and the timing of spoken speech generated by a subscriber utilizing secondary unit 113. FIG. 3 depicts an inadequacy of one version of the prior art. As can be seen in FIG. 3, spoken speech begins at a time t1 almost immediately after the PTT button is pressed in secondary unit 113. While a subscriber continues to speak, channel set-up is still occurring. At the time t2 of FIG. 3, channel set-up has been completed and the subscriber's speech is then transmitted ("transmitted spoken speech" of FIG. 3). During the time from t1 to t2, the subscriber is speaking but the channel is yet to be set-up; speech during this time period is not accounted for, and is subsequently dropped ("dropped speech" of FIG. 3).

FIG. 4 generally depicts a timing diagram of the prior art which includes the channel set-up timing of FIG. 2 with the timing of transmitted spoken speech incurring a delay (D). As shown in FIG. 4, and is similar to that of FIG. 3, a subscriber begins to speak at a time t1 immediately after the PTT is pressed. At a time t2, channel set-up has been completed and the spoken speech by the subscriber is allowed to be transmitted ("transmitted spoken speech" of FIG. 4). Instead of merely dropping the speech between times t1 to t2, the entire spoken speech by the subscriber is buffered and consequently delayed by the time t1 to t2. While delaying the entire transmitted spoken speech is better than dropping some amount of spoken speech, this delay (D) still presents significant confusion in certain scenarios as stated above. Important to note is that the delay (D) stays throughout the users entire transmission, and is never compensated for.

FIG. 5 generally depicts a timing diagram in accordance with the invention. As depicted in FIG. 5, spoken speech is initiated immediately after the PTT button is pressed at time t1 and speech is not transmitted until time t2, which is when channel set-up has been completed. Although a delay (D) is initially incurred as in FIG. 4, that delay does not stay throughout the users entire transmission as in FIG. 4. Likewise, speech is not dropped as shown in FIG. 3.

FIG. 5 shows an additional time from t2 to t3 where compressed speech is transmitted ("transmitted compressed speech"). Compression of the speech occurs in time, as depicted in FIG. 6 and FIG. 7. Shown in FIG. 6 is typical pattern of speech having certain ranges where speech is silent (i.e., silent speech S1, S2, and S3) and where speech is present (i.e., present speech P1, P2, and P3). To remove the periods of silent speech, a "speech present detector" (SPD) device is utilized. Such a device detects present speech (and thus deletes or ignores silent speech) based on the amount of energy in the present speech as depicted, for example, in FIG. 6. Such SPDs are well known in the art, and constitute a conventional feature with respect to the present invention. Many such SPD techniques are known in the art of time assigned speech interpolation (TASI). FIG. 7 represents time-compressed speech which results after speech present detection (SPD). The pattern of FIG. 7 is a typical time-compressed speech pattern that is transmitted during the time interval t2–t3 of FIG. 5 in accordance with the invention.

FIG. 8 generally illustrates circuitry which may generate the timing of FIG. 5 in accordance with the invention. Analog input speech is converted to digital samples 804 through use of an analog-to-digital (A/D) converter 803. The A/D output of digital samples 804 is fed (as a digital word) to the input of a FIFO 827, which is used as an elastic speech buffer. In the preferred embodiment, FIFO may be a model IDT72103/104 FIFO available from Integrated Device Technology, Inc. Continuing, FIFO 827 output samples 805 are passed to a digital-to-analog (D/A) converter 830, which reconstructs a sampled waveform representing output speech.

The reading of information from FIFO 827 to generate output speech for transmission occurs when a 8000/sec CLOCK 821 is provided to a READ input of FIFO 827. The CLOCK 821 is gated by AND gate 818, which is controlled by "Channel Assigned" signal 824. Signal 824 is always to be asserted except between the time the PTT is pressed and the transmitter becomes enabled on the particular voice channel and is transmitting speech. That is, FIFO 827 is caused to store any input speech during system channel request/assignment/set-up periods.

The storage of samples 804 of input speech into FIFO 827 occurs when the CLOCK 821 is present on a STORE input of FIFO 827. Through the logical combination of OR gate 812 and AND gate 815, this CLOCK 821 appears at the STORE input whenever either FIFO 827 is substantially empty (through FIFO's 827 automatic assertion of FIFO empty signal 809) or whenever present speech, as explained with reference to FIG. 6 above, is detected at the input. The former condition (when FIFO 827 is substantially empty) is facilitated when there is one word remaining in the memory array of FIFO 827. The latter condition is facilitated through the use of speech present detector (SPD) 806, as explained with reference to FIG. 6 and FIG. 7 above, which asserts its output whenever appreciable speech energy is detected at it's input.

The function of the circuitry of FIG. 8 is summarized as follows. During the channel access period, denoted in FIG. 5 by delay (D), READ input of FIFO 827 is inhibited, and FIFO 827 will begin storing samples 804 of input speech. Since FIFO 827 is no longer empty, the samples 804 of input speech stored is gated strictly by the presence of active speech (present speech). Thus, compression is achieved by eliminating silence portions of the input speech (silent speech) and occurs as the speech is stored in FIFO 827 acting as an elastic speech buffer. Stored speech is output from FIFO 827 after the channel is assigned, and since the output rate, when enabled, is faster (on the average) than the input rate, FIFO empty signal 809 will again assert when FIFO 827 is substantially empty. During transmission of the stored speech, pitch-correction may need to be employed by the transmitter. Speech compression is therefore inhibited when the delay between the input speech and the output speech is eliminated.

FIG. 9 depicts a prior art secondary unit which is utilized to implement the prior art timing depicted in FIG. 4. As depicted in FIG. 9, a voice buffer 900 buffers the spoken speech of FIG. 4 until the assigned channel is set-up, which occurs at time t2 of FIG. 4. As previously stated, since the delay (D) is not accounted for, the delay stays throughout the user's entire transmission. Transmitter 903 and receiver 909 are conventional analog/frequency modulation (FM) transmitters and receivers.

FIG. 10 is a secondary unit 113 which beneficially employs the present invention. As depicted in FIG. 10, voice buffer 900 of FIG. 9 is replaced with circuitry 800 of FIG. 8 in accordance with the invention. Input into block 800 is speech in, clock 821, and "channel assigned" signal 824 as shown in FIG. 8. Exiting block 800 is speech out, also shown in FIG. 8. When PTT is pressed, controller 1012 enables transmitter 1015 to make the channel request as depicted in time period 1 of FIG. 2 (and FIG. 5). Controller 1012 then enables receiver 1018 to receive the channel assignment message transmitted by primary unit 103 as depicted in time period 2 of FIG. 2 (and FIG. 5). During this time, the user begins speaking at time t1. When the channel has been set-up (time t2), "channel assigned" signal 824 initiates transmission of the time-compressed speech discussed above and depicted in FIG. 7. As discussed above in reference to FIG. 8, when a first-in first-out buffer 827 is substantially empty, the system of FIG. 10 will transition from transmitting the stored time-compressed speech on the assigned communication channel to transmitting normal speech (which is the same as spoken speech) on the communication channel.

Figure 11:
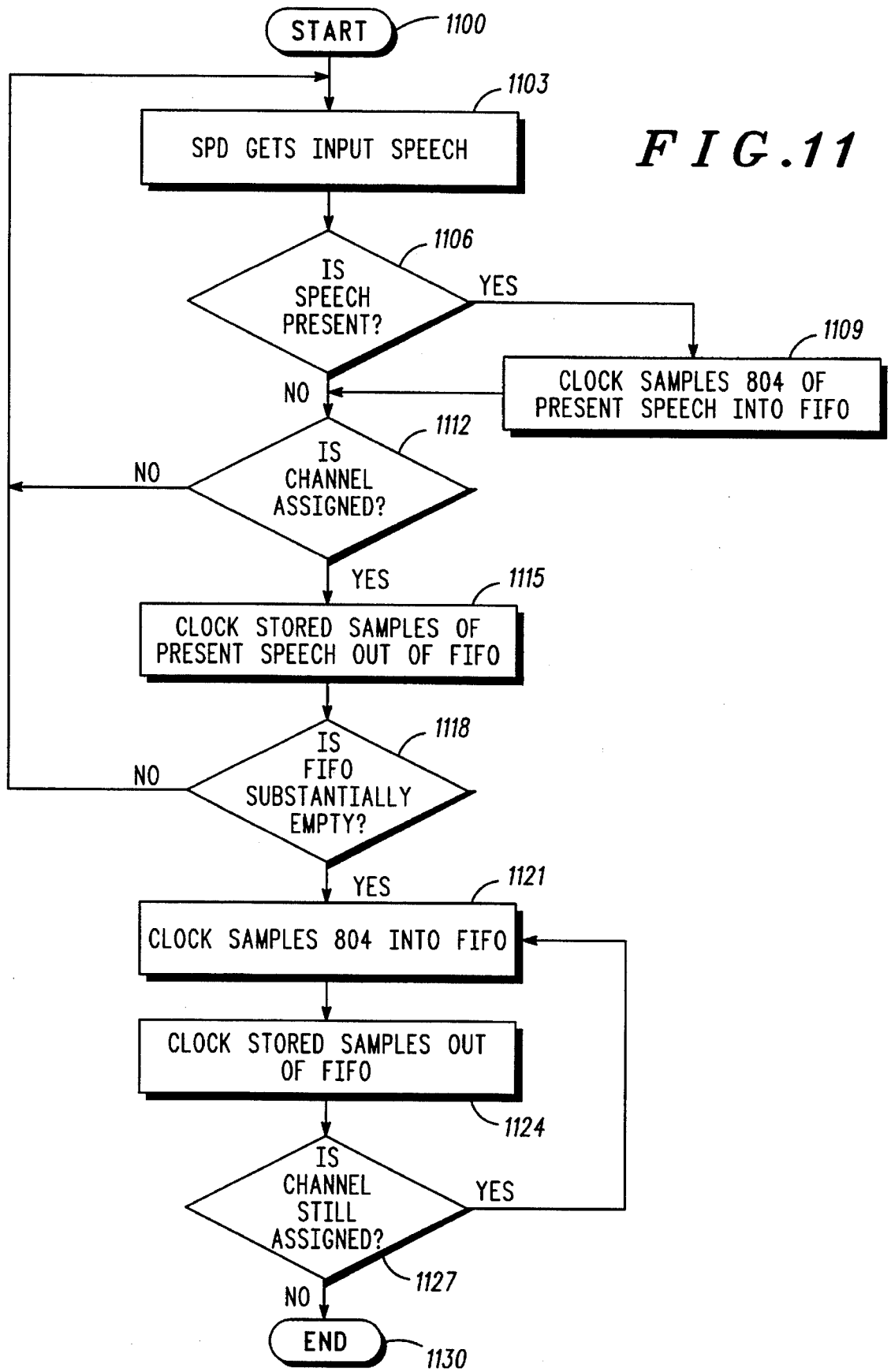
FIG. 11 generally illustrates a flow diagram of the steps the circuitry of FIG. 8 undergoes to generate the timing depicted in FIG. 5 in accordance with the invention.

FIG. 11 generally illustrates a flow diagram of the process the circuitry of FIG. 8 undergoes to generate the timing depicted in FIG. 5 in accordance with the invention. The process starts at step 1100 and flows to step 1103 where SPD 806 gets input speech. A test is then performed at step 1106 to determine whether speech is present. If speech is present ("YES" of step 1106), step 1109 clocks samples 804 of present speech only into FIFO 827. As is apparent from this series of steps, if SPD 806 does not detect present speech, no speech at all is docked and stored into FIFO 827; thus, only the time-compressed pattern, as that depicted in FIG. 7, is docked into FIFO 827 by these first series of steps.

If speech is not present ("NO" of step 1106), or after samples 804 of present speech only have been docked into FIFO 827, a test is performed at step 1112 to determine if the channel is assigned. If the channel is not assigned ("NO" of step 1112), the process will return to step 1103 where SPD 806 gets input speech. If the channel is assigned ("YES" of step 1112), the stored samples of present speech (the time-compressed speech stored in FIFO 827 at step 1109) are docked out of FIFO 827. This step begins at time t2 of FIG. 5 and is initiated by a change in "channel assigned" signal 824 of FIG. 8 (and FIG. 10). After clocking present speech out of FIFO 827, a test is performed at step 1118 to determine if FIFO 827 is substantially empty. If it is not ("NO" of step 1118), then the process will return to step 1103 where SPD 806 gets input speech. Significant to note in this series of steps is that although the channel is assigned ("YES" of step 1112), samples 804 of present speech may still be clocked into FIFO 827 by step 1109 while the stored samples of present speech are being docked out of FIFO 827 by step 1115.

When FIFO 827 is substantially empty ("YES" of step 1118), step 1121 docks samples 804 (not just of present speech as depicted in FIG. 7, but of both present speech and silent speech as depicted in FIG. 6) into FIFO 827 and step 1124 clocks stored (albeit temporarily) samples out of FIFO 827. Step 1121 begins at time t3 of FIG. 5 and is initiated by a change in "FIFO empty signal" 809. This time t3 also represents the time of transitioning from transmitting time-compressed speech to transmitting normal speech. Continuing, a test is then performed at step 1127 to determine if the channel is still assigned. If it is ("YES" of step 1127), then steps 1121 and 1124 are repeated. If the channel is no longer assigned ("NO" of step 1127), communication ends at 1130.

Alternative, and more effective techniques for compressing the time scale of speech are well known. Several such techniques are: Francis F. Lee, "Time Compression and Expansion of Speech by the Sampling Method," *Journal of the Audio Engineering Society*, vol. 20, no. 9, November 1972 and Richard V. Cox et al., "Real-Time Implementation of Time Domain Harmonic Scaling of Speech for Rate Modification and Coding," *IEEE Transactions on Acoustics, Speech, and Signal Processing*, vol. ASSP-31, no. 1, February 1983. These techniques, which can be implemented with high speech digital signal processors, create synthetic speech which perceptually sounds quite normal. Despite the speed increase, the speech is in no way distorted nor is the pitch frequency altered. Each of these techniques utilize time scale modification of speech to control the rate of speech, and can be beneficially employed to effect the instant invention as an alternative to the silence removal technique described above. With these more sophisticated technologies, it also becomes possible to control the speech rate transition from compressed to normal. The transition from transmitting stored time-compressed speech on the communication channel to transmitting the normal speech on the communication channel may be made to occur either gradually or abruptly by controlling the speed compression rate employed. The transition then is essentially based on some deterministic characteristic of the system. Examples of deterministic characteristics include, inter alia, linearly decreasing or exponentially decreasing the speech rate during transition. When the system has transitioned from transmitting time-compressed speech to transmitting normal speech, the system has effectively avoided dropping speech and accounted for the initial delay (D) incurred during channel set-up.

What we claim is:

1. A method of mitigating speech loss in a communication system, the communication system having a secondary unit incurring a delay to establish communication to a primary unit, the method comprising the steps of:

storing speech during at least the delay to produce stored speech;

transmitting the stored speech at a second speech rate; and transmitting normal speech at a first speech rate at the end of transmitting the stored speech at the second speech rate, wherein the second speech rate is faster than the first speech rate and the stored speech is pitch-corrected during transmission.

2. The method of claim 1 wherein the step of storing speech during at least the delay further comprises the step of storing speech in a FIFO buffer during at least the delay.

3. The method of claim 2 wherein the step of transmitting the normal speech at the first speech rate at the end of transmitting the stored speech at the second speech rate further comprises the step of transmitting the normal speech at the first speech rate when the FIFO buffer has been substantially depleted.

4. The method of claim 1 wherein the step of transmitting the stored speech at said second rate further comprises the step of controlling the second speech rate by removing periods of silent speech.

5. The method of claim 1 wherein the step of transmitting the stored speech at said second rate further comprises the step of controlling the second speech rate by time scale modification of the speech.

6. A method of mitigating speech loss in a communication system, the communication system having a secondary unit incurring a channel set-up delay during communication establishment to a primary unit on a communication channel, the method comprising the steps of:

storing time-compressed speech during at least the channel set-up delay to produce stored time-compressed speech;

transmitting the stored time-compressed speech on the communication channel; and transitioning from transmitting the stored time-compressed speech on the communication channel to transmitting normal speech on the communication channel when none of the stored time-compressed speech remains to be transmitted wherein the stored time-compressed speech is pitch-corrected during transmission.

7. The method of claim 6 wherein the step of transitioning further comprises the step of transitioning either gradually or abruptly based on a deterministic characteristic of the communication system.

8. An apparatus for use in a communication system, the communication system incurring a delay to establish communication between a primary unit and a secondary unit, the apparatus comprising:

means for storing speech during at least the delay to produce stored speech; and means for transmitting the stored speech at a second speech rate and transmitting normal speech at a first speech rate at the end of transmitting the stored speech at the second speech rate, wherein the second speech rate is faster than the first speech rate and the stored speech is pitch-corrected during transmission.

9. The apparatus of claim 8 wherein the means for storing speech during the delay further comprises means for storing speech in a FIFO buffer during at least the delay incurred during communication establishment.

10. The apparatus of claim 9 wherein the means for transmitting the normal speech at the first speech rate at the end of transmitting the stored speed at the second speech rate further comprises means for transmitting the normal speech at the first speech rate when the FIFO buffer has been substantially depleted.

11. The apparatus of claim 8 wherein said apparatus is implemented in either the primary unit or the secondary unit.

12. The apparatus of claim 7 wherein said means for transmitting the stored speech at the second speech rate further comprises means for controlling the second speech rate by removing periods of silent speech.

13. The apparatus of claim 7 wherein said means for transmitting the stored speech at the second speech rate further comprises means for controlling the second speech rate by time scale modification of the speech.

14. An apparatus for use in a communication system, the communication system incurring a delay to establish communication between a primary unit and a secondary unit, the apparatus comprising:

means for converting input speech having present speech and silent speech into speech samples representing Said present speech and said silent speech;

means, having as input said input speech, for determining when speech is present in said input speech;

storage means, coupled to an output of said means for converting, for storing said speech samples;

an OR gate having as an output said samples representing said present speech when said storage means is substantially empty;

a first AND gate, responsive to a clocking signal and said output of said OR gate, for allowing said samples representing said present speech to be clocked into said storage means; and a second AND gate, responsive to a channel assignment signal and said clocking signal, for allowing said samples representing said present speech to be clocked out of said storage means for transmission over a communication channel.

\* \* \* \* \*